UNITED STATES PATENT OFFICE 2,119,253

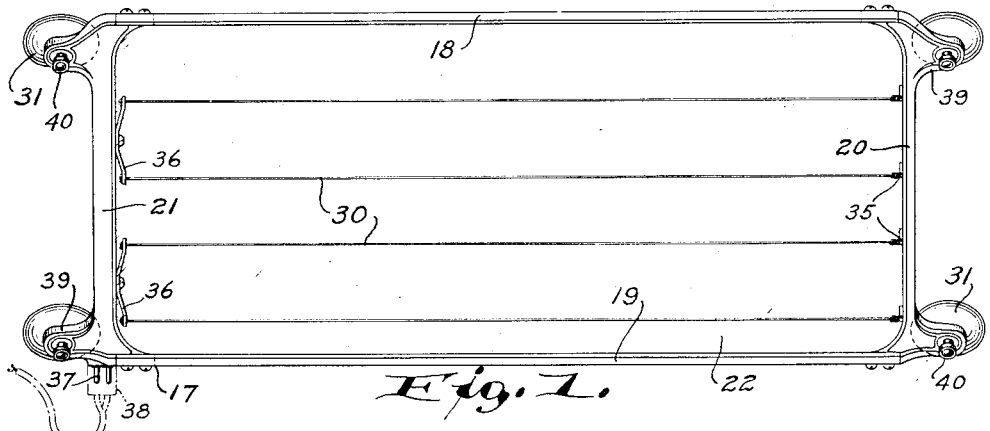

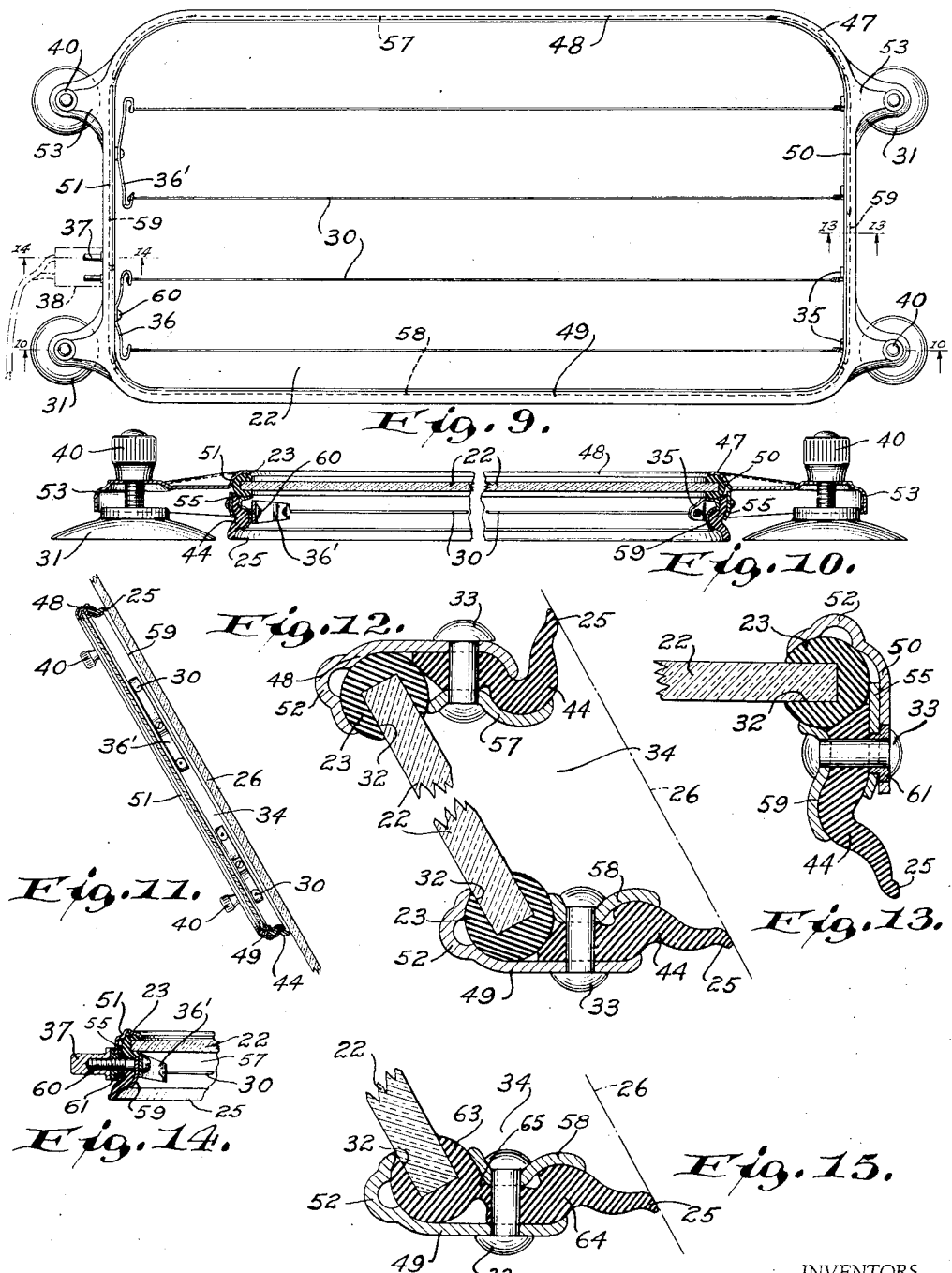

VEHICLE FROST SHIELD

Joel R. Thorp and Steen Strand, West Allis, Wis., assignors to The Fulton Company, West Allis, Wis., a corporation of Wisconsin Application April 22, 1936, Serial No. 75,715

11 Claims. (Cl. 20—40.5)

Our present invention relates in general to improvements in the art of maintaining clear vision for the occupants of a vehicle through the windows of the vehicle enclosure, and relates more specifically to various improvements in the construction of so-called vehicle frost shields especially adapted for cooperation with the windshield and other normally inclined windows of automobiles or the like.

Generally defined, an object of the present invention is to provide an improved frost shield assemblage which is durable in construction, highly effective in use, and which is especially adaptable to abruptly inclined windshields or other windows.

Numerous types of so-called frost shields for automobile windshields or the like have heretofore been proposed and marketed, and it is a well known fact, that these devices must be capable of providing a hermetically sealed air space in order to eliminate internal frost and vapor deposits on the shields without applying heat, and in order to properly apply the heat when external sleet and ice deposits are to be removed from the windshield. It has heretofore been common practice to effect sealing of the confined air space with the aid of a single rubber sealing strip coacting with the edge portion of the glass forming part of the frost shield, and having a continuous flexible lip remote from the glass for engaging the windshield; and while these prior seals were relatively satisfactory when the frost shields were applied to the older types of substantially vertical windshields, they are found to be objectionably obstructive to the vision when applied to the more modern abruptly inclined windshields of streamlined vehicles. The frames of the prior frost shields, which are necessarily of considerable width in order to provide a suitable air space and to maintain the heating elements out of contact with the glass, were disposed substantially perpendicular to the plane of the windshield, and thus tend to additionally interfere with the normal horizontal line of vision of the vehicle occupants when these prior frost shields are applied to the modern abruptly inclined windshields and rear windows. For these reasons, the prior frost shields are not well adapted for application to and for use in conjunction with the abruptly sloping windshields and other windows of modern automobiles, motor boats and airplanes which are built for high speed.

It is a more specific object of the present invention to provide an improved frost shield unit which is especially adapted for effective cooperation with an abruptly inclined window and which is so constructed that it will offer minimum obstruction to the view of occupants of the vehicle to which the device is applied.

Another specific object of the invention is the provision of improved means for hermetically sealing the confined air space of a frost shield or the like so as to insure most efficient operation of such devices.

A further specific object of the present invention is to provide improved frame structure for a frost preventing assemblage, which is simple and durable in construction and which may be readily manufactured and applied to the final unit.

Still another specific object of our invention is the provision of a new and useful frost shield sealing assemblage, whereby the joints between the glass and the frame, and between the frame and windshield may be most effectively sealed.

An additional specific object of the invention is to provide an improved frost shield wherein the transparent glass sheet may be mounted within the frame without danger of breakage, and in which the heating elements are effectively supported out of contact with the glass.

These and other objects and advantages will be apparent from the following detailed description.

A clear conception of embodiments of the several features constituting the present invention, and of the mode of constructing and of utilizing frost shields built in accordance with the improvement, may be had by referring to the drawings accompanying and forming a part of this specification wherein like reference characters designate the same or similar parts in the various views.

Fig. 1 is a rear view of one type of the improved frost shield, showing the same in inclined position as when attached to the interior of an abruptly inclined windshield, the frame of this frost shield being composed of several sections;

Fig. 2 is a section taken longitudinally through the frost shield of Fig. 1;

Fig. 3 is an end view of the assemblage of Figs. 1 and 2, showing the frost shield applied to a fragment of an ordinary windshield;

Fig. 4 is a transverse vertical section through the frost shield of Figs. 1, 2 and 3;

Fig. 5 is an enlarged fragmentary transverse vertical section through the frost shield showing the details of construction of the frame and seals;

Fig. 6 is an enlarged fragmentary section through one of the end sections of the frame and through the adjacent portions of the seals, of the frost shield of Figs. 1 to 5 inclusive;

Fig. 7 is an enlarged fragmentary transverse section through a modified form of frost shield having a sectional frame;

Fig. 8 is an enlarged fragmentary transverse section through another modified form of sectional frame frost shield;

Fig. 9 is a plan view of another type of the improved frost shield, the frame of this shield being formed of sheet metal and in one piece;

Fig. 10 is a fragmentary enlarged section taken longitudinally through the modified frost shield of Fig. 9, the section being taken along the line 10—10;

Fig. 11 is a transverse vertical section through the frost shield of Figs 9 and 10, showing the same applied to an inclined window;

Fig. 12 is an enlarged fragmentary transverse vertical section through the modified frost shield of Figs. 9, 10 and 11, showing the details of construction of the frame and seals;

Fig. 13 is a similarly enlarged section through one end of the frame and through the adjacent portions of the seals, of the device shown in Figs. 9 to 12 inclusive, taken along the line 13—13 of Fig. 9;

Fig. 14 is a somewhat enlarged fragmentary section through the opposite end of the shield of Fig. 9, taken along the line 14—14; and Fig. 15 is an enlarged fragmentary transverse vertical section through a modified type of frost shield having a sheet metal frame and a single seal.

While our invention has been shown and described herein as being embodied in electrically heated frost shields especially adapted for attachment with the aid of suction cups to the windshield of automobiles, it is not the intent to unnecessarily restrict the scope by such specific embodiment.

Referring to Figs. 1 to 6 inclusive of the drawings, the improved sectional frame frost shield illustrated therein, comprises in general a continuous rigid outer frame 17 formed of upper and lower sections 18, 19 and end sections 20, 21 secured thereto; a transparent sheet 22 of glass or the like disposed within the frame 17; a resilient seal 23 preferably formed of rubber, interposed between the peripheral edge of the sheet 22 and the frame 17; a second resilient seal 24 also preferably formed of rubber, carried by the frame 17 and having a continuous flexible lip 25 engageable with a window 26 such as the windshield of a vehicle; special inner retainer strips 27, 28, 29 for normally holding the seals 23, 24 in position relative to the frame 17; heating elements 30 supported from the end sections 20, 21 of the frame 17 and spanning the space confined by the frame and seals; and suction cups 31 detachably associated with the end sections 20, 21 for attaching the device to a window 26 or the like.

The rectilineal upper and lower sections 18, 19 of the frame 17 may be formed of extruded metal strips, and are so constructed that when the assembled frost shield is applied to an inclined window 26, the outermost walls of these sections will extend away from the sheet 22 at oblique angles relative to the planes of the sheet 22 and window 26, and substantially horizontally, as clearly shown in Fig. 5. The opposite end sections 20, 21 of the frame 17 are rigidly attached to the upper and lower sections 18, 19 by means of screws, rivets or otherwise, and these end sections 20, 21 may be formed either of metal, "Bakelite", or other suitable material. The end sections of the frame 17 are so formed that when the device is attached to a window 26, these sections will extend away from the sheet 22 and toward the window 26 in directions substantially perpendicular to the planes of the transparent members, thus providing a substantially rectangular continuous frame 17 which will offer minimum obstruction to the horizontal line of vision through the frost shield and window.

The continuous resilient seal 23 which is interposed between the peripheral edge of the transparent sheet 22 and the frame 17 has substantially uniform transverse circular cross-section throughout its length, and is provided with a preformed groove 32 within which the entire edge of the sheet 22 is snugly confined. The exterior of the seal 23 is forced into intimate contact with the internal correspondingly curved surfaces of the frame sections 18, 19, 20, 21 as shown in Figs. 5 and 6, by the sheet 22, and is held in sealing position by the retainer strips 27, 28, 29 which may be formed of extruded metal or of sheet metal, and are held in place by screws 33 or by rivets. The continuous rubber seal 23 also has a substantially circular cross-section cooperable with the frame sections and with the retainer strips, in the manner shown in Figs. 5 and 6, and the flexible lip 25 projects outwardly with respect to the circular portion of this seal 23 but not substantially beyond the frame 17. The transverse cross-section of the strips 27, 28, 29 is such that they will most effectively cooperate with the adjacent frame sections 18, 19, 20, 21 to hold the seals 23, 24 in place, and so as to afford minimum obstruction to vision.

The parallel heating elements 30 which are of well known construction may extend cross-wise of the frame in either direction, and are formed either of straight or loosely coiled wires extending through the air space 34 confined between the sheet 22 and the window 26 by the seals 23, 24. As shown, the corresponding ends of the elements 30 are supported from the end frame section 20 through the adjacent retainer strip 29 by small ears 35 formed on the strip 29, being insulated from the metal sections of the frame 17; and the opposite corresponding ends of the elements 30 are supported from leaf springs 36 which are carried by the end frame section 21 through the adjacent retainer strip 29 and are likewise insulated from the metal sections of the frame 17. The heating wires are spaced from the sheet 22 and window 26 and the springs 36 maintain these elements 30 under tension at all times. The elements 30 are connected to terminals 37 in a well known manner, and an energizing plug 38 may be applied to the terminals 37 when artificial heating of the air space 34 is desired.

The suction cups 31 are detachably attached to ears 39 formed integral with the end sections 20, 21 of the frame 17, by means of clamping knobs 40, and the cups 31 are so disposed that they will not interfere with the flexible lip 25 of the seal 24 when this lip is in sealing contact with the window 26. There may be two or more cups 31 applied to each frost shield, and the frost shield may be freely removed from the stems of the cups 31 without removing the latter, upon withdrawal of the knobs 40.

Referring specifically to Fig. 7, the frost shield structure shown therein is similar to that shown in Figs. 1 to 6 inclusive in that the frame is constructed of sections formed of extruded metal strips or the like, and this assemblage also utilizes two seals 23, 24, one of which has a groove 32 for receiving the peripheral edge of the transparent sheet 22, and the other of which has a flexible lip 25 adapted to engage the window 26. In this modification, the frame sections 41 are formed with circular recesses 42, 43, and no retainer strips need be employed. The seal 23 is confined within the recesses 42 of the several sections 41 of the frame, while the seal 24 is likewise confined in the grooves 43 of these sections. This modified device may be provided with heating elements 30 properly insulated from the metal frame sections, and may obviously be assembled in a manner similar to that above explained in connection with Figs. 1 to 6 inclusive. The upper and lower frame sections 41 of the modified device, are likewise formed so that they will cooperate with the transparent sheet 22 and window 26 to provide a confined air space 34 having a rhomboidal vertical cross-section, thereby producing minimum obstruction to the vision of the occupants of a vehicle with which the modified frost shield is associated.

Referring specifically to Fig. 8, the modified frost shield illustrated therein again has a frame 17 of construction similar to that of Figs. 1 to 6 inclusive, and also utilizes a resilient seal 23 of substantially circular transverse cross-section formed with a groove 32 adapted to snugly engage the peripheral edge of the transparent sheet 22. The other seal 44 is however of different construction, being formed to extend into snug engagement with the seal 23, but having a flexible lip 25 engageable with the window 26 to again provide a confined air space 34. The seal 44 is held in position by modified retainer strips 45 which are secured to the frame sections by means of rivets 46. In this modified construction the upper and lower frame portions are again formed for oblique annular disposition relative to the sheet 22 and window 26, so as to position these upper and lower portions substantially horizontal and to thereby again eliminate undesirable obstruction to the vision. This modified structure may also be provided with properly insulated heating elements 30, and may be held in position with the aid of suction cups or the like.

Referring to Figs. 9 to 14 inclusive of the drawings, the improved one-piece frame frost shield illustrated therein, comprises in general a continuous rigid outer frame 47 having upper and lower horizontal portions 48, 49 connected by integral end portions 50, 51, these frame portions being formed of sheet metal and having a continuous stiffening bead 52 and integral ears 53; a transparent glass sheet 22 disposed within the sheet metal frame 47; a continuous resilient seal 23 interposed between the beaded portion of the frame 47 and the sheet 22 and having a preformed groove 32 engaging the peripheral edge of the glass; a second resilient seal 44 carried by the frame 47 preferably in contact with the seal 23 and having a continuous flexible lip 25 engageable with a windshield 26 to provide a concealed air space 34; sheet metal retainer strips 57, 58, 59 secured to the frame 47 by properly insulated rivets 33 to normally hold the seals 23, 44 in position; heating elements 30 supported from the frame through the end retainer strips 59 both of which are insulated from the remainder of the frame; and suction cups 31 detachably secured to the ears 53 by means of knobs 40, for attaching the frost shield to a window 26.

As previously indicated, the frame 47 is stamped from a single piece of sheet metal, and the flanges of the upper and lower portions 48, 49 are disposed parallel to each other and extend away from the plane of the sheet 22 toward the window 26 at like oblique angles as clearly shown in Fig. 12 so as to provide substantially rhomboidal vertical cross-section for the air space 34. The flanges of the opposite side portions 50, 51 of the frame 47, extend away from the plane of the sheet 22 and toward the window 26 substantially perpendicular, as shown in Fig. 13, thereby providing a frame assemblage which offers minimum obstruction to vision when applied to an abruptly inclined window 26. The continuous bead 52 besides stiffening the frame structure, also produces a decorative appearance, and the ears 53 are preferably off-set from the corners and may be dished as shown in order to add rigidity thereto. This off-setting of the ears 53 is important since it enables the use of large radii connecting these ears with the frame proper.

The continuous seals 23, 44 are preferably formed of rubber, and are normally snugly confined in slightly compressed condition against the frame 47, by the sheet metal retainer strips 57, 58, 59 of which the strips 59 are insulated from the frame 47 and from the strips 57, 58, see Figs. 12 and 13. At the zone of the ears 53, where the seal 44 has no direct backing from the frame portions 50, 51, auxiliary retaining strips 55 secured to the opposite ends of the frame 47, may be provided as illustrated in Figs. 10 and 13. These retainer strips 55 may be formed of sheet metal and can be attached to the frame ends 50, 51 by means of rivets. The seals 23, 44 may be molded to any desired shape, and preferably contact each other in order to insure hermetic sealing of the space 34.

The heating elements 30 of the modified assemblage of Figs. 9 to 14 inclusive are again of well-known construction and may span the frame 47 in either direction, being disposed within the space 34 and under tension, by virtue of the leaf springs 36' so that these elements will never engage the adjacent surfaces of the glass. The leaf springs 36' of this embodiment are of special construction as shown in Fig. 9, having their ends folded back to gain resiliency. The elements 30 are electrically connected to small ears 35 on the two-piece right retainer strip 59 by means of knots at the corresponding ends of the elements 30, and the opposite ends of these elements are likewise connected to the springs 36'. The springs 36' are attached to the one-piece left retainer strip 59 by means of screws 60, which are insulated from the frame 47 and from the strip 55 by insulating bushings 61 as shown in Fig. 14. The terminals 37 may be connected to any suitable source of electrical energy by means of an ordinary connector plug 38, in a well known manner. The suction cups 31 of the modified device also function in a well-known manner to attach the frost shield to a window 26, and the shield may obviously be freely removed from the cups 31 upon removal of the knobs 40.

Referring specifically to Fig. 15, the modified frost shield structure illustrated therein is similar to that of Figs. 9 to 14 inclusive, differing therefrom only in the construction of the seals. In this modified assemblage, the seals 63, 64 are integrally united by means of a flexible connecting portion 65, this connecting portion 65 being sufficiently flexible to permit the portions 63, 64 to be shifted relative to each other during application of the composite sealing strip to the frame and transparent sheet. The frame, sheet 22, and retainer strips of this modified assemblage, are all similar in construction to the corresponding parts of the assemblage shown in Figs. 9 to 14 inclusive. When the composite sealing strip is applied to the frame and glass, perfect sealing is insured between the portion 63 and the transparent sheet 22, and also between the portions 63, 64 of the seal. This modified device is again constructed so as to offer minimum obstruction to the vision when the frost shield is applied to a window 26, as previously explained in connection with all other modifications shown herein, and may likewise be provided with heating elements 30 similar to those previously described.

The mode of attaching the improved frost shield to windows, should be clearly apparent from the foregoing description of the detailed construction, constituting the present invention. It will be apparent that when any of the improved frost shields are applied to a window, the angular disposition of the upper and lower portions of the frame will afford very little obstruction to the horizontal view, and will thereby insure safer driving on the part of the operator of the vehicle. The compound seals whether formed in two parts or in one, will likewise produce minimum obstruction to the vision, and may be effectively applied to insure hermetic sealing of the air space 34. It will be noted that in each of the several modifications, the vertical cross-section of the air space 34 is substantially rhomboidal in shape and all of the assemblages provide durable structures which may be readily applied and removed whenever desired. The several frame structures are extremely rigid and highly attractive in appearance, and the improved frost shield may be used either with or without artificial heat. While the heating elements 30 have been shown horizontally and attached to or supported by the vertical end sections or portions of the frame assemblage, these heating elements 30 may obviously be disposed in vertical planes and suspended from the upper and lower horizontal end portions of the frame assembly, without departing from the spirit of this invention.

It should be understood that it is not desired to limit the present invention to the exact details of construction and to the precise mode of assemblage herein shown and described, for various modifications within the scope of the claims may occur to persons skilled in the art.

We claim:—

1. In a frost shield, a continuous frame adapted to coact with an inclined window and having upper and lower portions of greater horizontal than vertical transverse width extending substantially horizontally away from the window at an oblique angle when said frame is applied thereto, and a transparent sheet carried by said frame and disposed substantially parallel to the window.

2. In a frost shield, a transparent sheet, and a frame surrounding and supporting said sheet, said frame having upper and lower portions of greater horizontal than vertical transverse width extending substantially horizontally away from the plane of said sheet in the same direction at an oblique angle, and having end portions disposed perpendicular to said plane.

3. In a frost shield, a transparent sheet, and a continuous frame surrounding and supporting said sheet, said frame having upper and lower parallel portions of greater horizontal than vertical transverse width extending substantially horizontally away from the plane of said sheet in like directions at like oblique angles, and having opposite substantially parallel end portions connecting said upper and lower portions and disposed substantially perpendicular to said plane.

4. In a frost shield, a transparent sheet, a continuous frame surrounding said sheet, and a continuous flexible seal interposed between said frame and the peripheral edge of said sheet, said frame having upper and lower parallel portions of greater horizontal than vertical transverse width extending substantially horizontally away from the plane of said sheet in like directions at like oblique angles, and having opposite substantially parallel end portions connecting said upper and lower portions and disposed substantially perpendicular to said plane.

5. In a frost shield, a transparent sheet, a continuous rigid frame surounding and spaced from the edge of said sheet, and a continuous rubber seal interposed between said frame and the peripheral edge of said sheet, said frame having upper and lower portions of greater horizontal than vertical transverse width provided with external bounding surfaces disposed substantially horizontal and at like oblique angles relative to the plane of said sheet, and having opposite end portions the external bounding surfaces of which are disposed substantailly normal to said plane.

6. In a frost shield, a transparent sheet, a frame surrounding and supporting said sheet, and a seal carried by said frame and having a continuous flexible lip formed for sealing contact with an inclined window, the upper and lower portions of said frame being of greater horizontal than vertical transverse dimensions and extending away from said sheet toward the window at oblique angles relative to the plane of the window.

7. In a frost shield, a transparent sheet, a frame surrounding and supporting said sheet, and a seal supported by said frame and cooperable with an inclined window to position said sheet substantially parallel to the window and to provide a confined air space therebetween, said frame having upper and lower portions of greater horizontal than vertical transverse dimensions extending away from said sheet and toward the window in substantially horizontal directions.

8. In a frost shield, a transparent sheet, a continuous frame surrounding said sheet, and sealing means interposed between said frame and the peripheral edge of said sheet and having a flexible lip cooperable with an inclined window to position said sheet substantially parallel to the window and to provide a confined air space between said sheet and the window, said frame having upper and lower portions of greater horizontal than vertical transverse dimensions extending at oblique angles relative to said sheet and the window to minimize the obstruction to vision through the window.

9. In a frost shield, a transparent sheet, a continuous frame surrounding said sheet, sealing means interposed between said frame and the peripheral edge of said sheet and having a flexible lip cooperable with an inclined window to position said sheet substantially parallel to the window and to provide a confined air space between said sheet and the window, said frame having upper and lower portions of greater horizontal than vertical transverse dimensions extending at oblique angles relative to said sheet and the window to minimize the obstruction to vision through the window, and heating means spanning said air space and secured to the opposite ends of said frame.

10. In a frost shield, a transparent sheet, and a support surrounding said sheet and having a continuous seal cooperable with an inclined window to provide a confined air space between said sheet and the window, the upper and lower portions of said support being relatively wide in the direction of view and disposed at an oblique angle so as to offer minimum obstruction to vision through the window in a horizontal direction.

11. In a frost shield, a transparent sheet, and a supporting frame surrounding said sheet and having a continuous seal cooperable with an inclined window to provide a confined air space between said sheet and the window, the upper and lower portions of said frame being relatively wide in the direction of view and being disposed substantially parallel and at like oblique angles relative to the plane of the window so as to offer least obstruction to vision through the sheet and window in a horizontal direction.

JOEL R. THORP.
STEEN STRAND.